No. 609,357. Patented Aug. 16, 1898.
P. LINDEMEYR.
WATER HEATER.
(Application filed Oct. 25, 1897.)
(No Model.)

Witnesses
C. M. Catlin.

Inventor
Philip Lindemeyr
by Benj. R. Catlin Attorney

UNITED STATES PATENT OFFICE.

PHILIP LINDEMEYR, OF BALTIMORE, MARYLAND.

WATER-HEATER.

SPECIFICATION forming part of Letters Patent No. 609,357, dated August 16, 1898.

Application filed October 25, 1897. Serial No. 656,297. (No model.)

*To all whom it may concern:*

Be it known that I, PHILIP LINDEMEYR, a resident of Baltimore, in the State of Maryland, have invented certain new and useful Improvements in Water-Heaters; and I do hereby declare the following to be a full, clear, and exact description of the invention, such as will enable others skilled in the art to which it pertains to make and use the same.
The invention relates to water-heaters; and its primary object is to provide simple, economical, and efficient means for heating water in bath-tubs.

The invention consists in the construction hereinafter described and pointed out.

Figure 1:
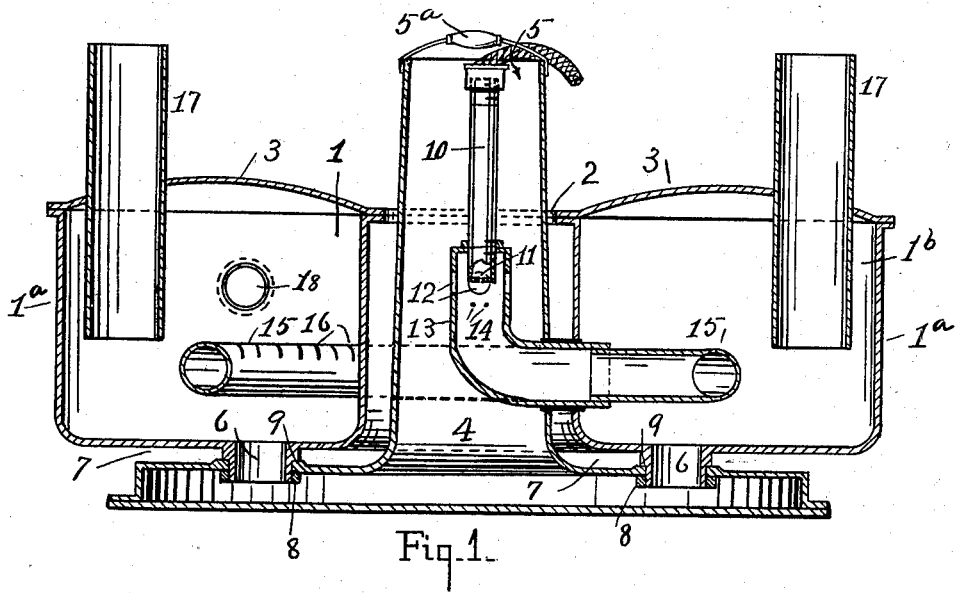
Figure 2:
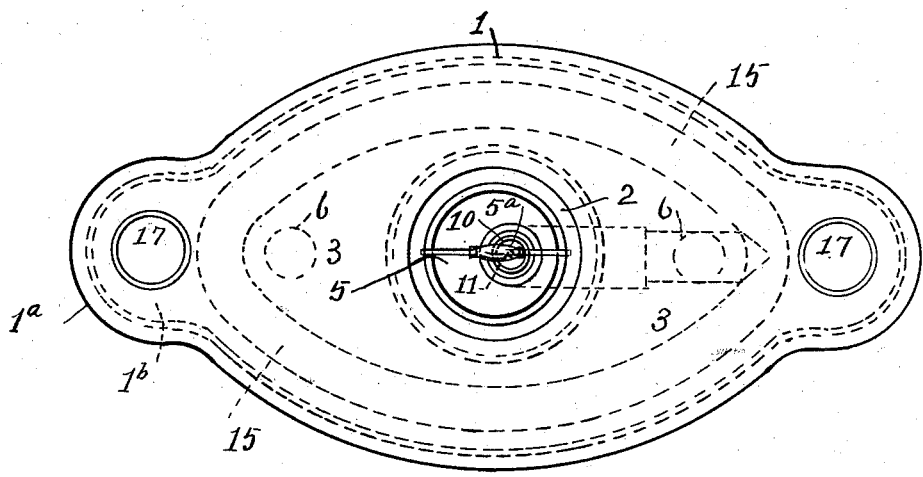

In the accompanying drawings, Figure 1 is a vertical section of the heater. Fig. 2 is a plan.

Numeral 1 denotes a vessel or gas-stove of approximately elliptical form in horizontal section, having a central opening 2, which may be circular in cross-section, though such form is not essential. The stove may also have other forms; but it is preferably oblong.
3 denotes a water-tight cover for the stove, and below said cover is the combustion-chamber. This cover is by preference made concave on its under side to promote freer circulation of hot gases thereunder.
4 denotes a water-tight air-chamber provided with an air-inlet 5.

5ª denotes a handle fixed to the top of the air-inlet and kept cool by inflowing air.

The air-inlet tube is kept cooler than the combustion-chamber by the water surrounding it, and this prevents overheating of the handle. The handle is situated remote from the combustion-exits and centrally with respect to them and the combustion-chamber, whereby it can at all times be safely and comfortably used.

The walls of the two chambers 1 and 4 are connected by short tubes or conduits 6 in such manner as to leave an open water-circulating space 7 between them.

8 denotes nuts adapted to crowd the top wall of the air-chamber against shoulders 9 on the connecting-tubes.

10 denotes a gas-supply pipe having a delivery-exit at 11 on a level with the center of air-inlets 12 and adapted to entrain air through said openings after the manner of the so-called "Bunsen" burners.

The pipe 13 is provided with wires 14 transverse to promote the mixing of the gas and entrained air. Said pipe extends through the wall of the air-chamber and of the combustion-chamber and communicates with a continuous or ring burner 15, preferably of an approximately elliptical form. This burner is conveniently made of a tube bent into suitable form, which is preferably oblong, and burner-openings are provided by narrow slits 16 cut in the tube.

17 denotes chimneys or exit-pipes for the products of combustion. Their lower ends open preferably on a level with the burner-openings.

18 indicates a closed lighting-hole.

The chimneys and the air-inlet tube will in practical operation extend above the surface of the water to be heated. Water circulates freely between the walls of the air and combustion chambers and all around them, except that the air vessel constitutes the bottom of the structure and ordinarily rests on the bottom of the tub or receptacle the contents of which are to be heated.

The air vessel not only supplies air to be mixed with gas in the pipe 13, but furnishes a subsidiary supply to the combustion-chamber through the conduits 6.

The separation of the air and combustion chambers substantially as indicated, whereby water surrounds the latter and practically surrounds the former, insures that the entire surface of the combustion-chamber inclosure shall radiate or conduct heat directly to the water. It also obviates the heating of the air-chamber and its contained air, whereby an upward current or a tendency to such current in the tube 5 might be produced and escape of gas, either lighted or unlighted, caused. The inflowing air being kept at relatively a low temperature falls by gravity in tube 5 and aids the entraining of gas at the mixer and also increases the chimney-draft. The air and gas mixer being placed in the tube 5 is separated by two walls from the burner and effectually precludes the burner-flame from running back to the mixer, as happens in prior gas-burning bath-heaters.

It is an incidental advantage in the construction whereby the air-chamber is kept cool that more air can be supplied to the burner within the restricted compass of the heater in consequence of its greater density.

It has been found by experiment that if the lower open ends of the chimneys terminate much above the burner-openings there is a considerable loss of heat by the too rapid escape of the products of combustion and that if they terminate much below said openings imperfect combustion and the production of soot and loss of heat result, and it has been demonstrated that the arrangement shown and described produces the best results.

By preference the outer wall of the combustion-chamber has extensions $1^a$ approximately conformed to the interiorly-situated chimneys, whereby a contracted space $1^b$ for the circulation of hot gases closely adjacent the water is produced. These extensions, when curved or gracefully formed, impart an ornamental effect to the stove. The invention is not, however, characterized by the particular forms illustrated nor by any mechanical details except as pointed out.

Having described my invention, what I claim is—

1. In a heater adapted to be submerged in water, a burner, a combustion-chamber, an air-chamber separate from the combustion-chamber and connected by a communicating conduit adapted to supply air to the burner, an air and gas mixer situated in the inlet to the air-chamber and connected to the burner by a conduit extending through the walls of the air-chamber and an intermediate water-space and having a tight connection with said walls, and a chimney, said chambers being exposed to water on all sides and at all points except at the connecting-conduits, air-inlet, and chimney, substantially as described.

2. In a heater adapted to be submerged in water, a burner, a combustion-chamber, a separate air-supply chamber communicating with the combustion-chamber through one or more connecting-tubes, said tubes holding the chambers apart, whereby an intermediate water-circulating space is produced, substantially as described.

3. In a heater adapted to be submerged in water, a burner, a combustion-chamber, a separate air-supply chamber communicating with the combustion-chamber through one or more connecting-tubes, said tubes holding the chambers apart, whereby an intermediate water-circulating space is produced, the air-chamber serving as a supporting-base for the heater, substantially as described.

4. In a heater adapted to be submerged in water, the air-inlet pipe, the gas-supply pipe, the air and gas mixing tube 13 situated within the air-inlet tube and separated from the air-inlet tube by a water-space, the combustion-chamber, a burner, and a conduit connecting pipe 13 and the burner said conduit passing through the walls of the air-inlet and combustion-chamber and the intermediate water-space, substantially as described.

5. In a heater adapted to be submerged in water, the continuous combustion-chamber having an opening 2, the continuous ring-burner, the air-supply tube 5, a conduit whereby the combustion-chamber and the air-supply tube communicate, the gas-supply tube, and a chimney near each end of the combustion-chamber, all in combination, substantially as described.

6. In a heater adapted to be submerged in water, the continuous water-tight combustion-chamber, the burner, the centrally-situated air-inlet tube 5 surrounded by a water-circulating space and centrally situated with respect to the combustion-chamber and its exits, a conduit whereby the air-inlet tube and the combustion-chamber communicate, and a handle attached to the upper end of said air-inlet tube, substantially as described.

In testimony whereof I have signed this specification in the presence of two subscribing witnesses.

PHILIP LINDEMEYR.

Witnesses:
F. D. BLACKISTONE,
BENJ. R. CATLIN.